United States Patent
Inaba et al.

[11] Patent Number: 5,092,654
[45] Date of Patent: Mar. 3, 1992

[54] SEATBACK SPRING DEVICE

[75] Inventors: Yasuhisa Inaba, Handa; Masaki Okada, Yokkaichi; Fumio Wakamatsu, Okazaki, all of Japan

[73] Assignee: Aisin Seiki Kabushiki Kaisha, Kariya, Japan

[21] Appl. No.: 492,443

[22] Filed: Mar. 13, 1990

[30] Foreign Application Priority Data

| Mar. 30, 1989 | [JP] | Japan | 1-079898 |
| Mar. 30, 1989 | [JP] | Japan | 1-079899 |
| Mar. 30, 1989 | [JP] | Japan | 1-079900 |

[51] Int. Cl.$^5$ ............................................. A47C 7/46
[52] U.S. Cl. .............................. 297/284 A; 297/284 R; 297/284 C; 297/460
[58] Field of Search .......... 297/284, 452, 460, 284 A, 297/284 R, 284 C

[56] References Cited

U.S. PATENT DOCUMENTS

| 3,973,797 | 8/1976 | Obermeier et al. | 297/284 |
| 4,077,669 | 3/1978 | Fox | 297/452 |
| 4,458,943 | 7/1984 | Krakauer | 297/452 |
| 4,492,408 | 1/1985 | Lohr | 297/452 X |
| 4,583,783 | 4/1986 | Kanai | 297/452 |
| 4,697,848 | 10/1987 | Hattori et al. | |
| 4,761,035 | 8/1988 | Urai | 297/452 |
| 4,883,320 | 11/1989 | Izumida et al. | 297/452 |
| 4,895,412 | 1/1990 | Deley et al. | 297/460 X |
| 4,938,529 | 7/1990 | Fourrey | 297/284 |

FOREIGN PATENT DOCUMENTS 227134 8/1969 Sweden .............................. 297/284

Primary Examiner—Peter R. Brown
Attorney, Agent, or Firm—Finnegan, Henderson, Farabow, Garrett & Dunner

[57] ABSTRACT

In order to realize that a seatback spring device can fit to the curvature of the back of an occupant, a sheet, preferably in the form of fabric, which is deformable in all directions is employed and is provided on a frame. Adjustable tension applying means are provided to adjust the seatback in both the lumbar area, and the shoulder area.

14 Claims, 12 Drawing Sheets

5,092,654

SEATBACK SPRING DEVICE

BACKGROUND OF THE INVENTION

1. Field of the Invention

The present invention relates to a seatback spring device.

2. Description of the Prior Art

In a conventional seatback spring device, which has been disclosed in U.S. Pat. No. 4,697,848 for example, three laterally spaced S-shaped springs are arranged within a frame and are secured thereto.

However, this device does not fit to the curvature of the back of the occupant because the back is divided into two portions, one is supported by the springs and the other is not so.

SUMMARY OF THE INVENTION

It is, therefore, a principal object of the present invention to provide a seatspring device without the foregoing drawback.

Another object of the present invention is to provide a seatback spring which fits perfectly to the curvature of the back of the occupant.

According to the present invention, a seatback spring device is comprised of a frame and a sheet deformable in all directions and secured to the frame with tension.

DETAILED DESCRIPTION OF THE PREFERRED EMBODIMENTS

Figure 1:
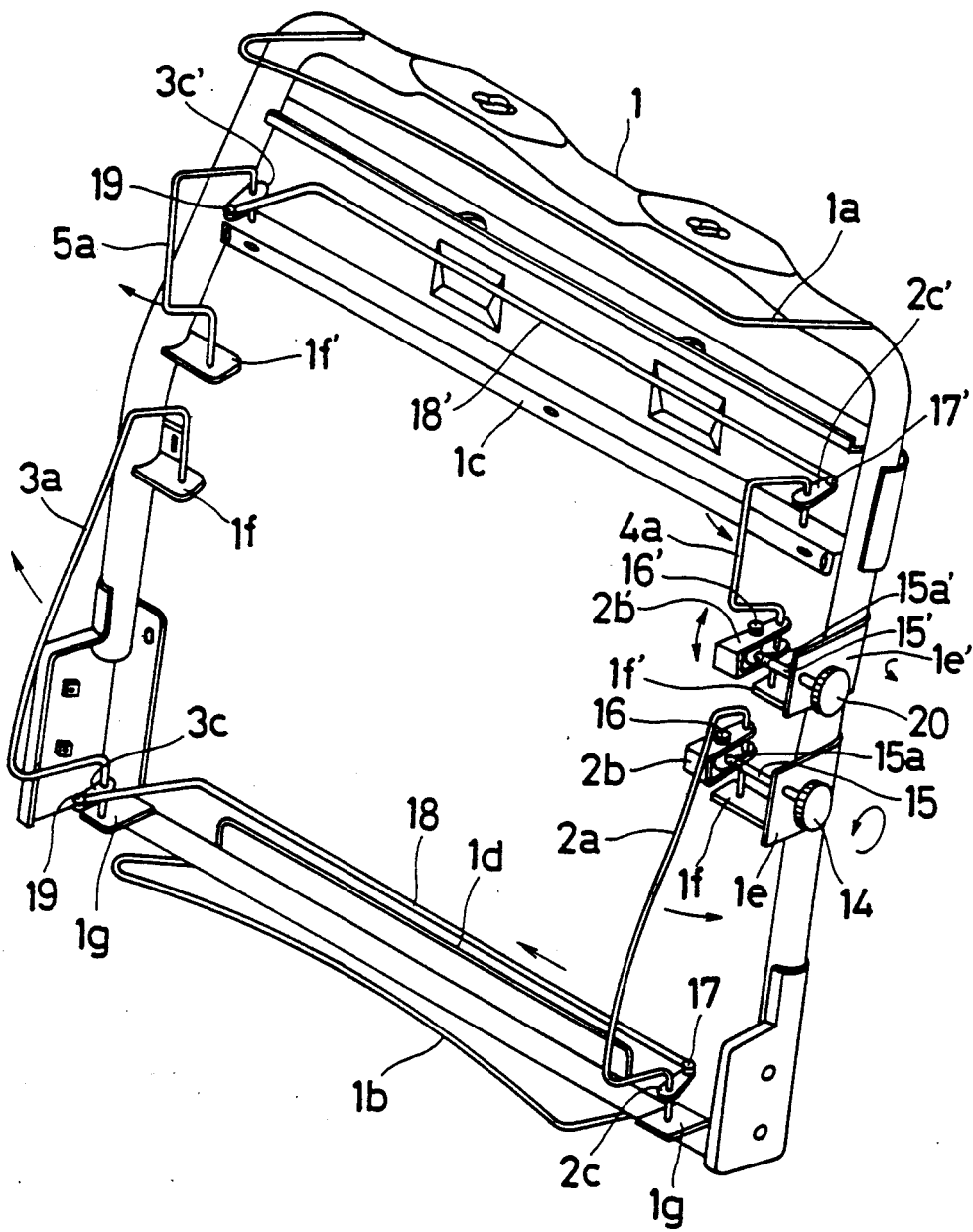
FIG. 1 is a perspective view of a frame with a lumbar support mechanism and a shoulder support mechanism which is to be included in a first embodiment of a seatback spring device.
Figure 2:
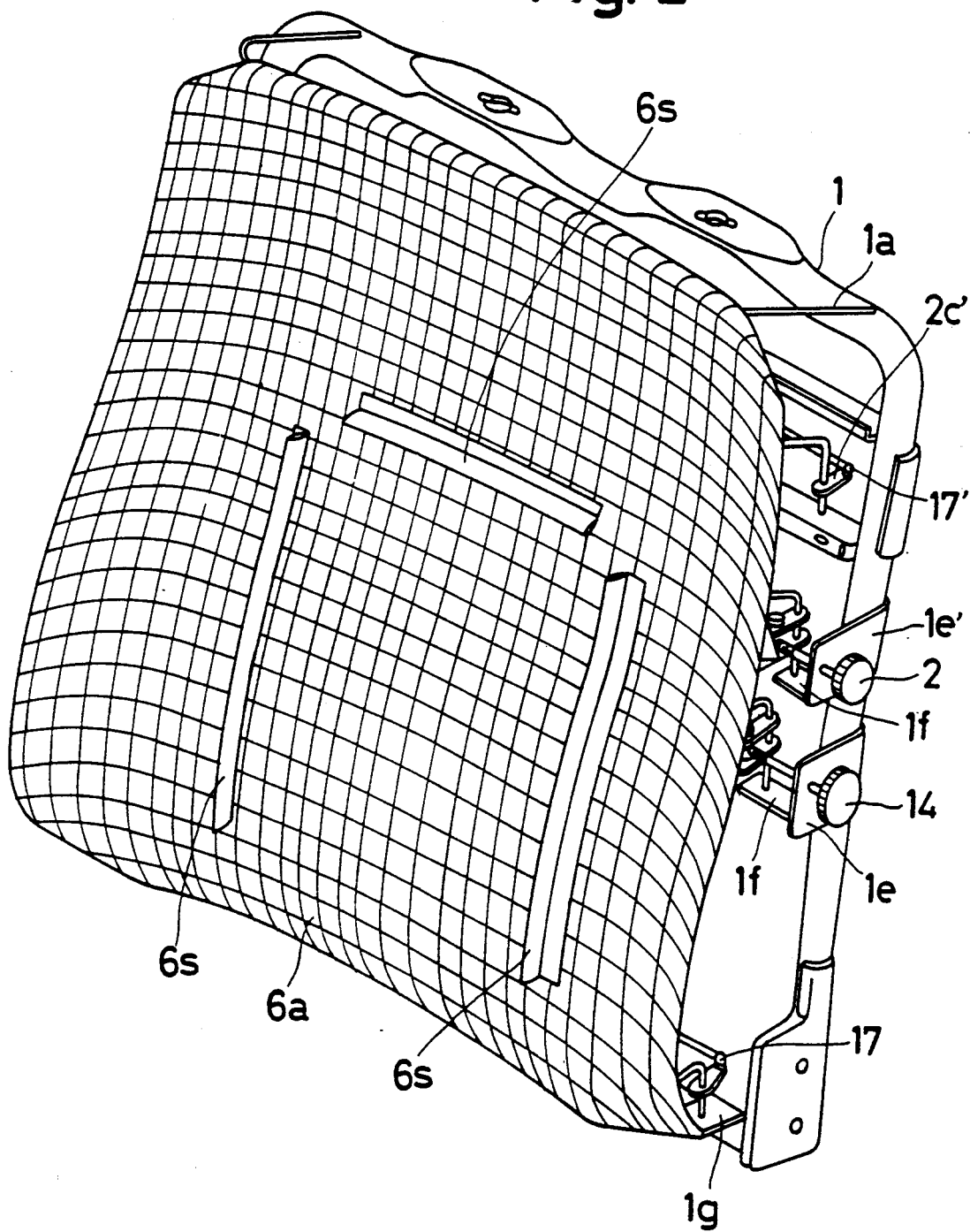
FIG. 2 is a perspective view of a frame shown in FIG. 1 to which a sheet fabric is provided.
Figure 3:
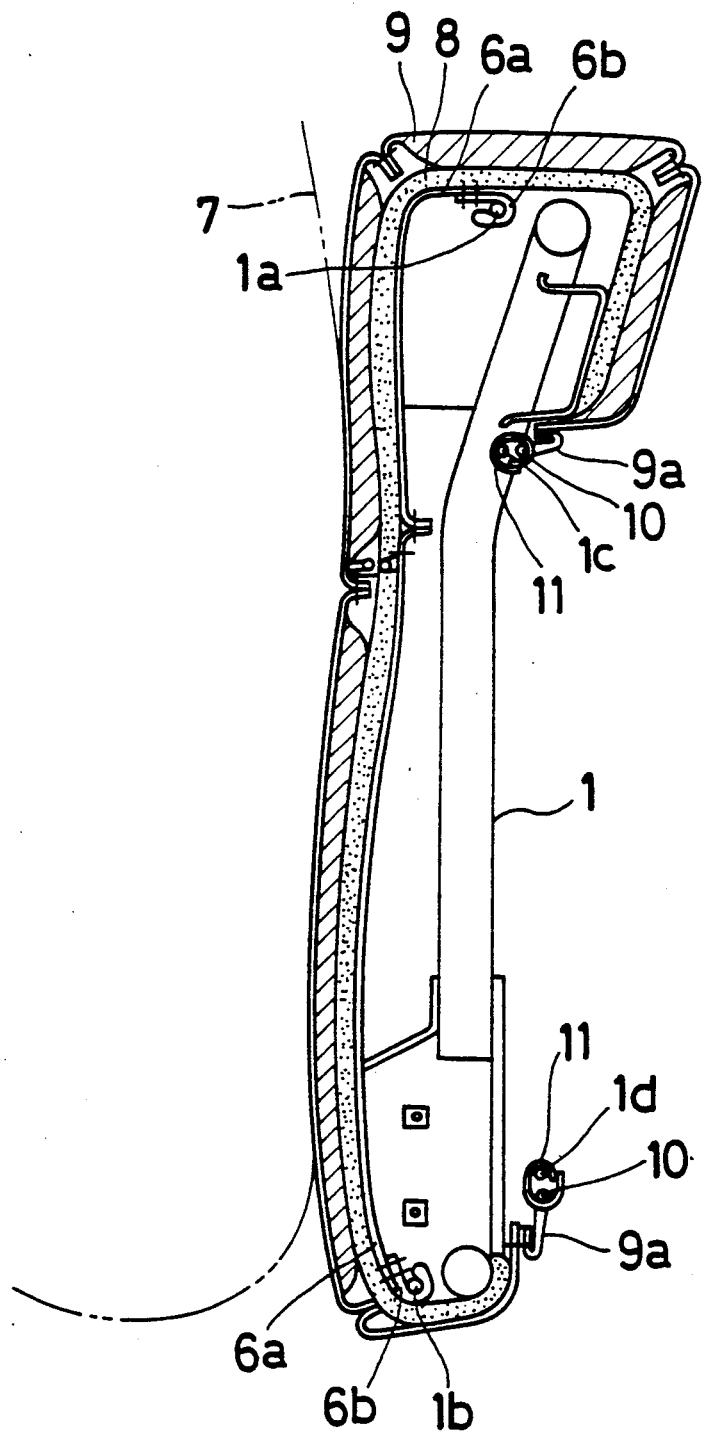
FIG. 3 is a vertical cross-sectional view of a first embodiment of a seatback spring device.
Figure 4:
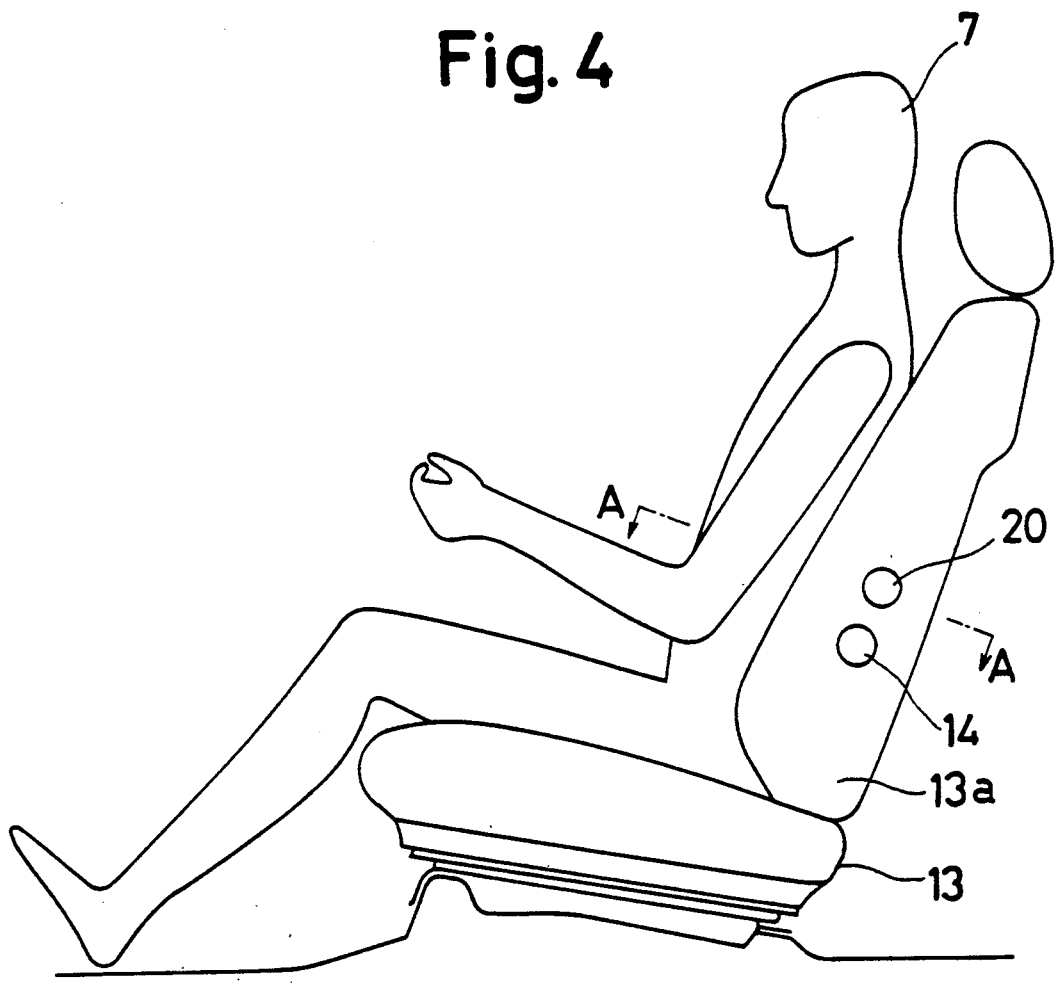
FIG. 4 is a side view of a first embodiment of a seatback spring device.
Figure 5:
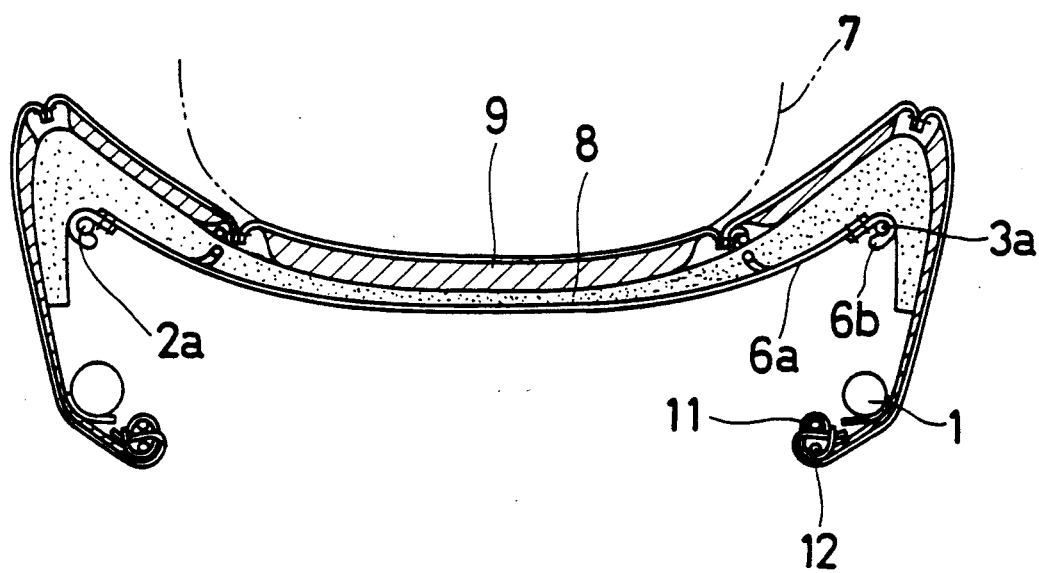
FIG. 5 is a cross-sectional view of a first embodiment of a seatback spring device taken along line A—A in FIG. 4.

Referring first to FIGS. 1 through 7, a seatback spring device includes a frame 1 in a rectangular configuration and a cross member 1c connected between a right portion and a left portion of the frame 1 as a stiffener therefor. A pair of vertically extending spaced supporting wires 1a and 1b are connected to an upper portion and a lower portion of the frame 1 respectively. Opposed ends of each wire 1a/1b are bent through 90 degrees and are attached to the frame 1.

A lumbar support mechanism has a bracket 1e which is connected or welded to the right portion (with reference to FIG. 1) of the frame 1 so as to be oriented in the frontward direction and a bracket 1f connected or welded to a lower end of the bracket 1e so as to be oriented in the left direction. A dial 14 with a shaft 15 is rotatably mounted on the bracket 1e and a distal end 15a of the shaft 15 is formed into a threaded configuration. A bracket 2b in the form of an approximately half inverted U-shaped configuration holds fixedly a nut 16 which is in threaded engagement with the distal end 15a of the shaft 15. A pair of laterally spaced brackets 1g and 1g are connected or secured to a lower portion of the frame 1. A supporting wire 2a having the illustrated configuration is pivoted at its upper end (lower end) to the bracket 1f (bracket 1g) after being secured to the bracket 2b (a bracket 2c). Another bracket 1f is secured or welded to the left portion of the frame 1.

A supporting wire 3a having the illustrated configuration has an upper end which is pivotably attached to the bracket, 1f after being bent in the downward direction and a lower end is pivotably attached to the bracket 1g after being secured to a bracket 3c. The bracket 2c (bracket 3c) is pivotably attached via a pin 17 (pin 19) to a right (left) end of a bar 18.

Upon rotation of the dial 14 in a direction illustrated or in the counterclockwise direction, the nut 16 is brought into a straight or an axial movement along the shaft 15, thereby rotating the bracket 2b through an angle in the counterclockwise direction as illustrated in FIG. 1 by an arrow, This rotation is, then, transmitted to the supporting wires 3a via the bar 18 and the brackets 2c, 3c, thereby rotating the supporting wires 2a, 3a though an angle. It is noted that the dial 14 can be rotated in the clockwise direction.

A shoulder support mechanism is provided on the right portion of the frame 1 (with reference to FIG. 1) so as to be positioned above the lumbar support mechanism. Since the shoulder support mechanism is similar to the lumbar support mechanism in construction and operation, the detailed description of the former is omitted. However, it should be noted that the following items show the corresponding relationship between both mechanisms.

(1) The supporting member 2a (3a) of the lumbar support mechanism corresponds to a supporting wire 4a (5a) of the shoulder support mechanism.

(2) The pair of members do not exist in the shoulder support mechanism corresponding to the pair of brackets 1g and 1g of the lumbar support mechanism, the cross member 1c is used so as to be corresponded to the brackets 1g and 1g.

(3) Dashed members of the shoulder support mechanism are corresponded to the non-dashed members of the lumbar support mechanism.

At suitable portions of an outer periphery of a sheet fabric 6a, there are secured plural hooks 6b made of synthetic resin. These hooks are in engagement with the supporting wires 2a, 3a, 4a and 5a. The fabric 6a has considerable flexibility and is deformable in all directions. This means that despite a variation in the curvature of the back of the occupant the sheet fabric 6a can fit thereto. As a raw material of the fabric, "Dymetrol Sateen Fabric" is used which is supplied from Dupon Co., Ltd. This material has an elastic coefficient ranging from 0.9 to 1.8 (N/% strain/cm), for example.

The sheet fabric 6a is covered with an urethane pad 8 and a covering member 9. Sacks 6s on the sheet fabric 6a are secured, after being passed through the urethane 8, to the covering member 9. At an upper portion and a lower portion, there are provided sacks 9a and 9a through which wires 10 and 10 are passed. Ends of the wires 10 are secured to the cross member 1c and the supporting wire 1d by rings 11 and 11, respectively. A wire 12 passing through lateral end of the sheet fabric 6a is secured to the frame 1 by the ring 11.

Figure 6:
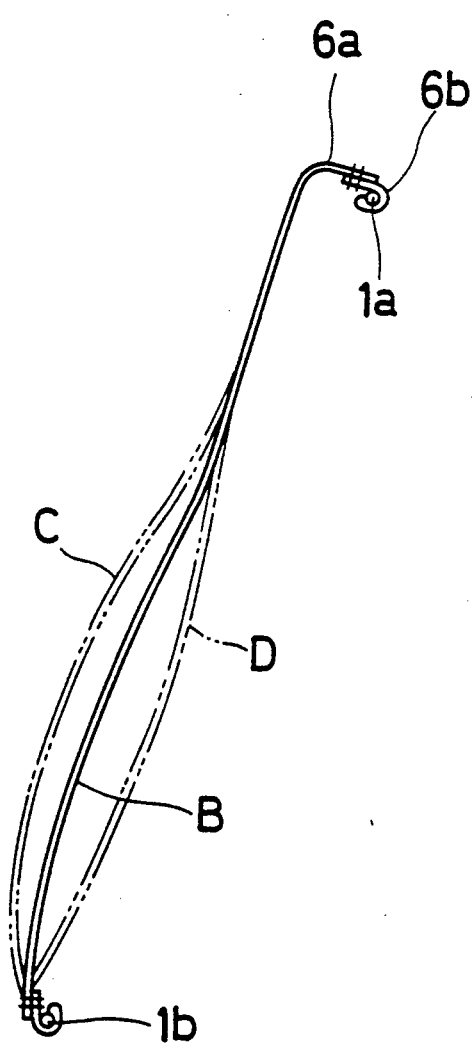
FIG. 6 is a view for showing operation of a lumbar support mechanism.

In operation, when the occupant 7 sits on a seat, 13, a seatback 13a including the covering member 9, the urethane pad 8 and the sheet fabric 6a is deformed. However, sometimes, the seatback 13a does not fit to the back of the occupant 7 despite the foregoing deformation. In such case, by using the lumbar support mechanism and/or the shoulder support mechanism, the seatback 13a can be varied in shape or configuration in the front and rear direction thereby enabling perfect or close fitness of the seatback 13a to the back of the occupant 7. In the case of a gap between the seatback 13a and a lumbar of the occupant 7, the handle 13 should be rotated in the counterclockwise direction in FIG. 1. As previously mentioned, this rotation brings the supporting wire 2a into the counterclockwise rotation and the supporting wire 3a into the clockwise rotation. Thus, the tension of the sheet fabric 6a secured to the wires 2a and 3a is increased, thereby a central cross-section of the sheet fabric 6a is transferred from a curve "D" to a curve "B" as shown in FIG. 6. Thus, the gap between the seatback 13a and the lumbar of the occupant 7 is deleted.

In case of an upper gap and a lower gap with respect to the lumbar of the occupant 7 due to excessive project of the seatback 13a in the frontward direction, the handle 14 should be rotated through an angle in the clockwise direction. Upon this rotation, as shown in FIG. 6, a curve "C" is hanged to the curve "B", thereby deleting the gaps.

Figure 7:
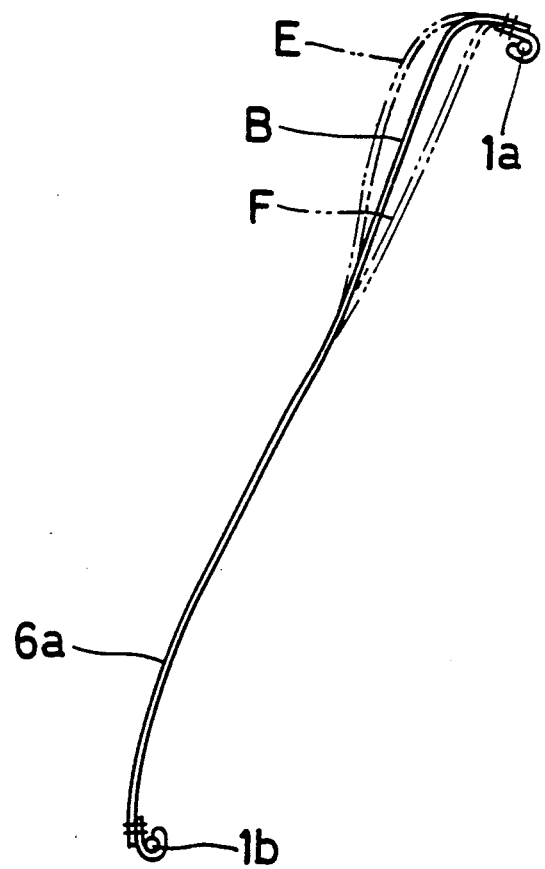
FIG. 7 is a view for showing operation of a shoulder support mechanism.
Figure 8:
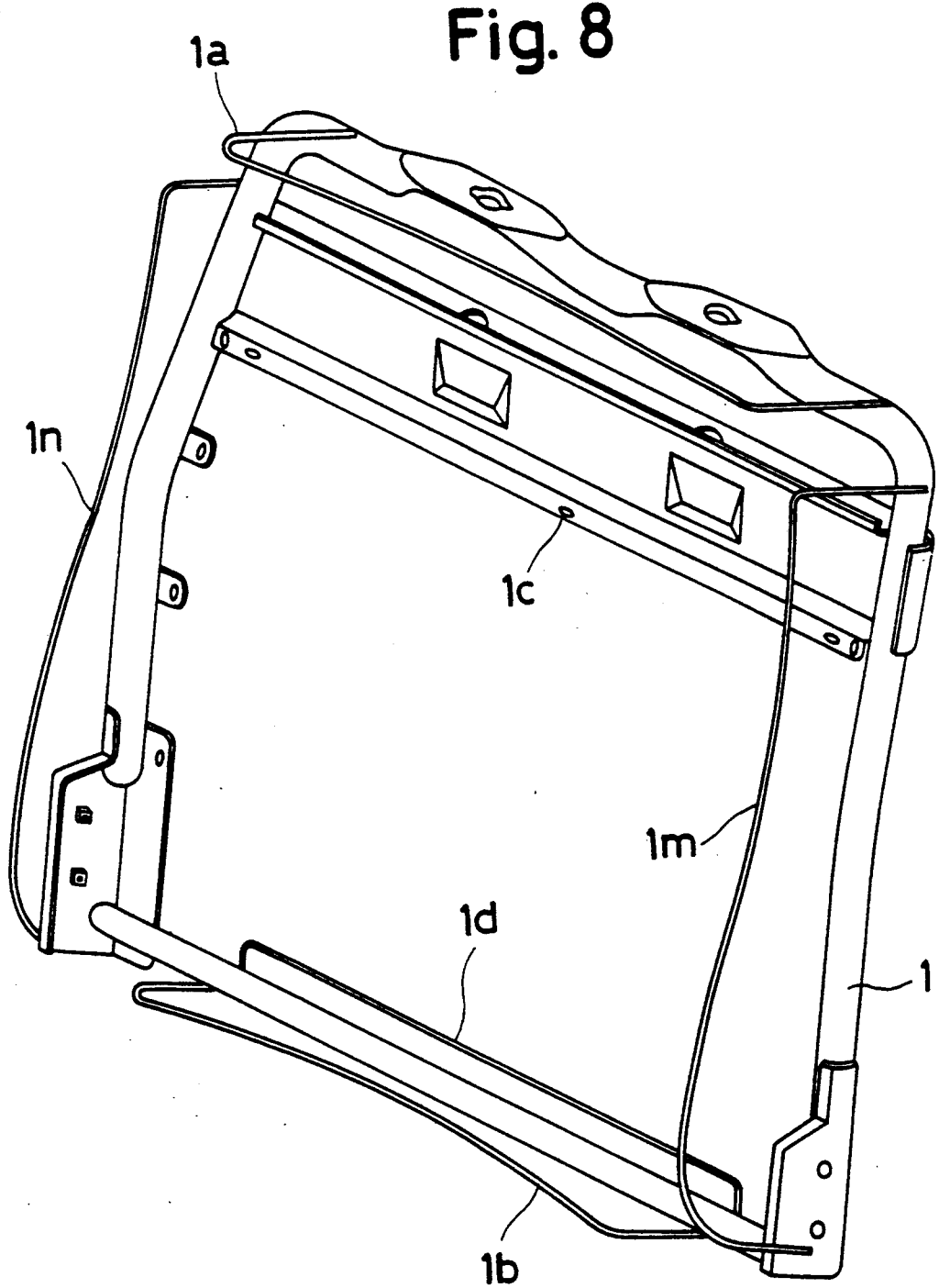
FIG. 8 is a perspective view of a frame of a second embodiment of a seatback spring device.
Figure 9:
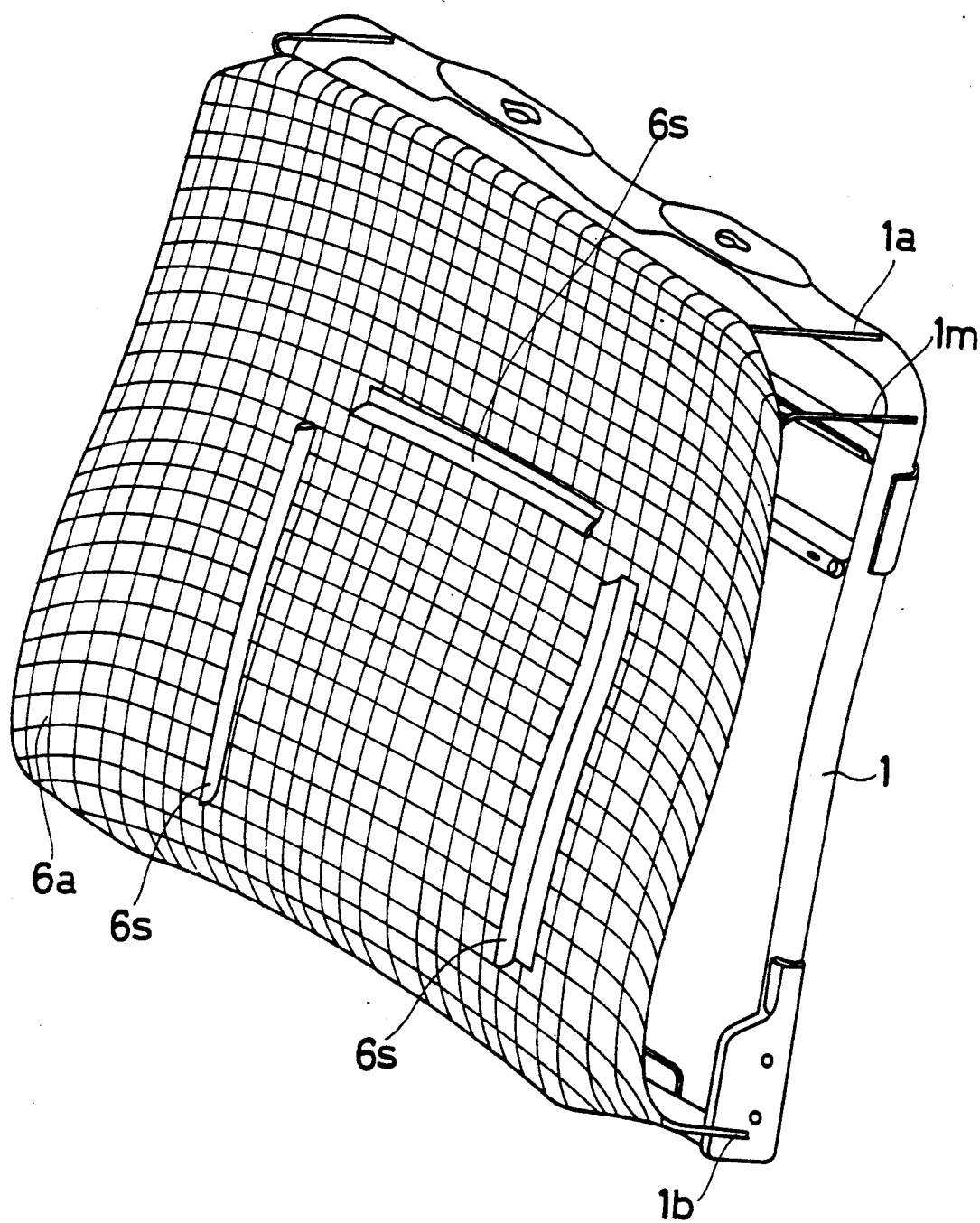
FIG. 9 is a perspective view of a frame shown in FIG. 8 to which a sheet fabric is provided.
Figure 10:
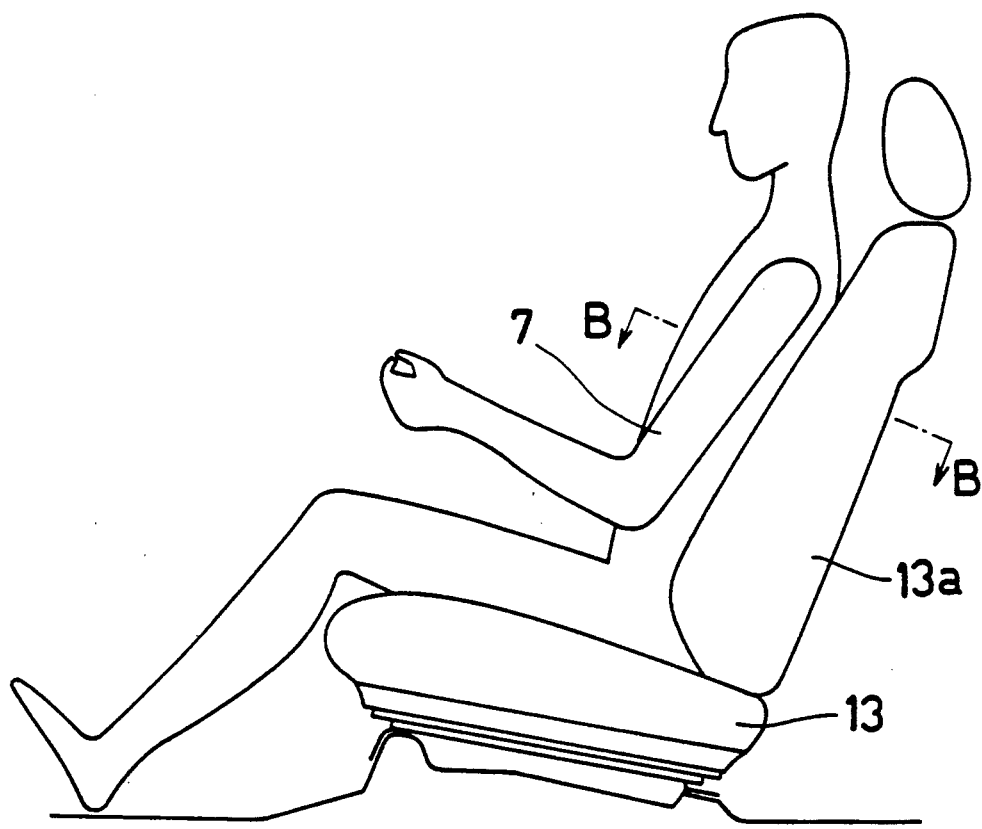
FIG. 10 is a side view of a second embodiment of a seatback spring.
Figure 11:
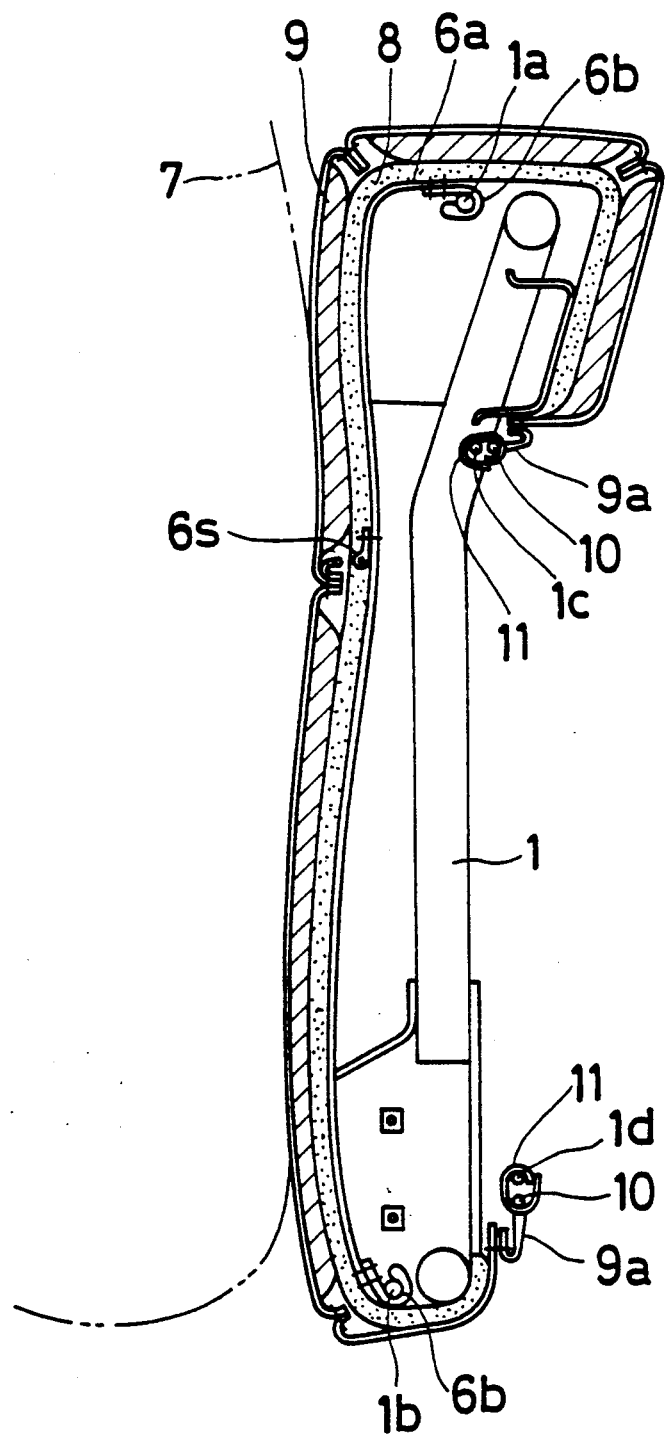
FIG. 11 is a vertical cross-sectional view of a seatback spring device shown in FIG. 10.
Figure 12:
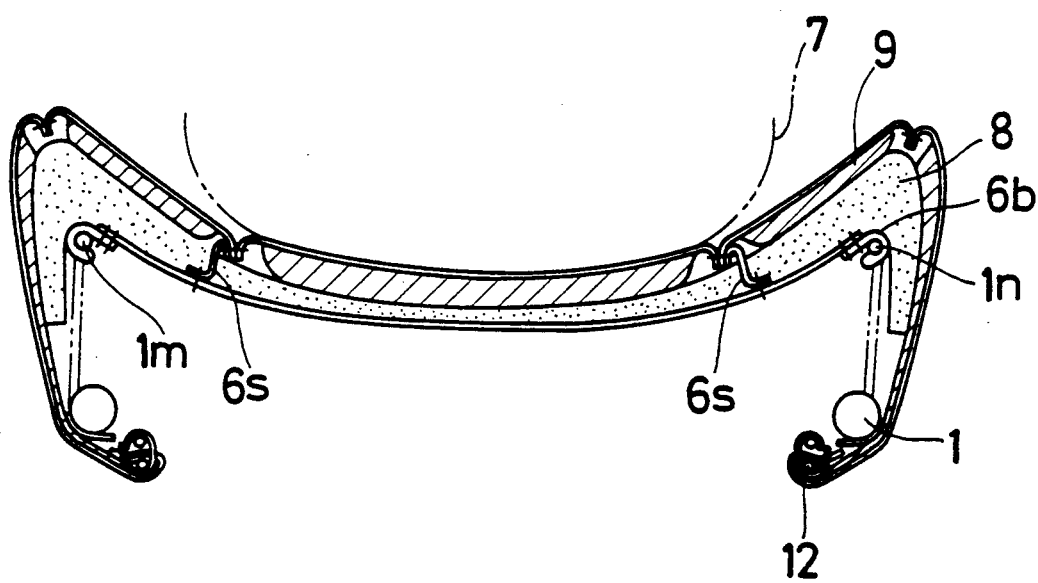
FIG. 12 is a horizontal cross-sectional view taken along line B—B in FIG. 10.
Figure 13:
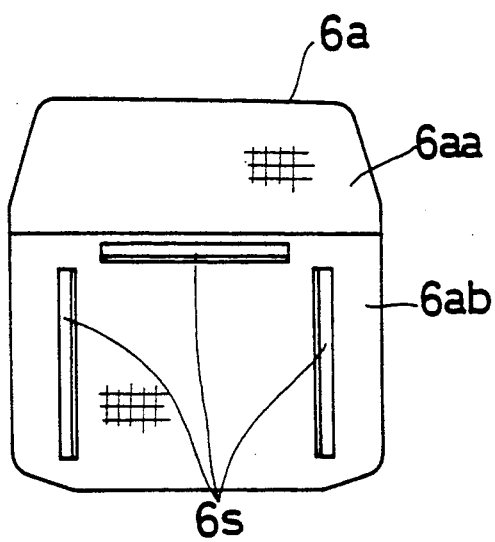
FIGS. 13 through 16 show alternations of a sheet fabric.
Figure 14:
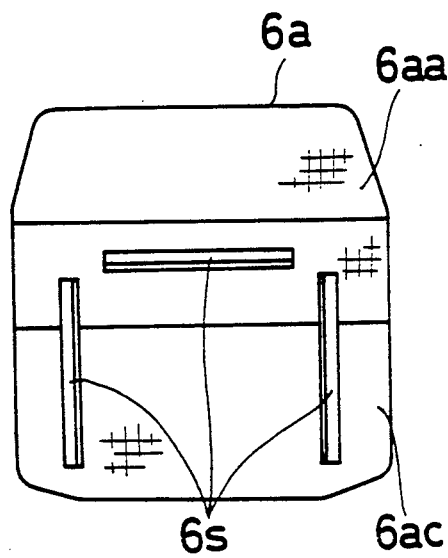
Figure 15:
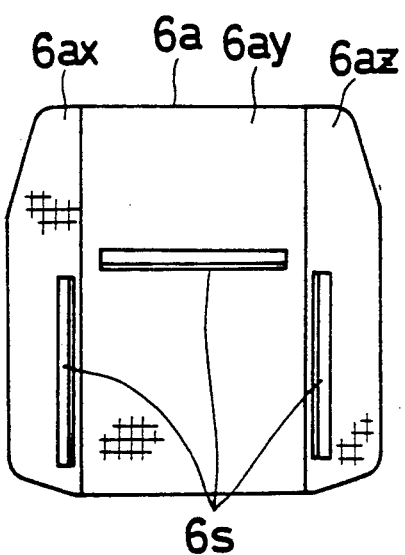

Similarly, upon rotation of the handle 20 of the shoulder support mechanism in the counter-clockwise (clockwise) direction, as shown in FIG. 7, a curve "F" (a curve "E") is moved to a curve "B". Thus, around the shoulder of the occupant 7, the seatback 13a can be fitted thereto.

It should be noted that a seatback spring device with either or none of the lumbar support mechanism and the shoulder support mechanism can be established, of course. For example, a simplified embodiment or configuration of a seatback spring is shown in FIGS. 8 through 12. In this embodiment, a sheet fabric 6b is connected, with a tension, to a supporting wire 1a, a supporting wire 1b, a supporting wire 1m and a supporting wire 1n. The tension depends upon the shape of the sheet fabric 6b, the elastic coefficient of the sheet fabric 6b and/or the shape or the curvature degrees of each supporting wire 1a/1b/1m/1n. By selecting suitable tension, the sheet fabric 6a can be brought into deformation in all directions. The remaining portions will not be detailed due to similarity thereof to the corresponding portions of the foregoing construction as shown in FIGS. 1 through 7.

Figure 16:
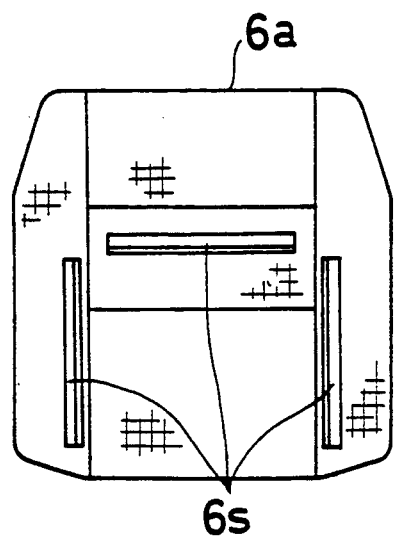

In FIGS. 13 through 16, there are shown various types of the sheet fabric 6a. In a sheet fabric 6a in FIG. 13 (FIG. 14), it is divided, in the vertical direction, into 2 (3) portions 6aa and 6ab (6aa, 6ab and 6ac) and the lower portion is larger than the upper portion in the elastic coefficient. Each sheet fabric 6a gives a comfortable feeling to the occupant 7 due to continuous change of elastic coefficient. In a sheet fabric 6a shown in FIG. 15, it is divided, in the horizontal direction, into 3 portions 6ax, 6ay and 6az. The elastic coefficient of the portion 6ay is smaller than the portions 6ax and 6az both of which is equal in the elastic coefficient. A sheet fabric 6a shown in FIG. 16 is in the form of the combination of the teachings in FIGS. 14 and 15.

Obviously, numerous modifications and variations of the present invention are possible in light of the above teachings. It is therefore to be understood that within the scope of the appended claims, the invention may be practiced otherwise than as specifically described herein.

What is claimed is:

1. A seatback spring device comprising:
    a frame having right and left side portions and upper and lower portions;
    a sheet having upper and lower portions and right and left sides deformable in a plurality of directions;
    fixed tension applying means at said upper and lower portions of said frame for applying a fixed tension to said upper and lower portions of said sheet;
    first adjustable tension applying means for applying an adjustable tension and deforming the lower portion of the sheet in at least one of the plurality of directions, said first adjustable tension applying means including first supporting means for supporting the sheet, said first supporting means including a first pair of vertically-extending spaced wires pivotably attached to the respective right and left side portions of the frame, at the lower portion of the frame, said first pair of spaced wires being linked to pivot in opposite directions relative to one another;
    second adjustable tension applying means for applying an adjustable tension and deforming the upper portion of the sheet in at least one of the plurality of directions, said second adjustable tension applying means including second supporting means for supporting the sheet, said second supporting means including a second pair of vertically-extending spaced wires pivotably attached to the respective right and left side portions of the frame, at the upper portion of the frame, said second pair of spaced wires being linked to pivot in opposite directions relative to one another; and
    attaching means for attaching said sheet to said fixed tension applying means, said first supporting means, and said second supporting means, whereby said sheet is deformable in each of said plurality of directions.

2. A seatback spring device according to claim 1, wherein the sheet is made of fabric.

3. A seatback spring device according to claim 1, wherein said sheet is in the form of a one piece.

4. A seatback spring device according to claim 1, wherein the sheet includes a plurality of connected portions.

5. A seatback spring device according to claim 4, wherein the portions are divided in a vertical direction.

6. A seatback spring device according to claim 5, wherein an elastic coefficient of each portion increases in a downward direction.

7. A seatback spring device according to claim 4, wherein the portions are divided in a direction extending from the right side to the left side of the sheet.

8. A seatback spring device according to claim 7, wherein the portions divided in the direction extending from the right side to the left side include outermost portions nearest the right and left side portions of the frame, each outermost portion having an elastic coefficient greater than an elastic coefficient of any one of the remainder of the portions.

9. A seatback spring device according to claim 1, wherein said first pair of vertically-extending spaced wires form a lumbar support mechanism.

10. A seatback spring device according to claim 1, wherein said second pair of vertically-extending spaced wires form a shoulder support mechanism.

11. A seatback spring device according to claim 1, wherein the supporting means further includes a second pair of vertically-extending spaced wires pivotably attached to respective right and left side portions of the frame to the other side of the upper and lower portions of the frame.

12. A seatback spring device according to claim 11, wherein said second pair of vertically-extending spaced wires are rotatable independently of said first pair of vertically-extending spaced wires.

13. A seatback spring device according to claim 1, wherein the adjustable tension applying means further includes tension adjusting means for selectively adjusting the tension and deforming the sheet in at least one of the plurality of directions.

14. A seatback spring device according to claim 13, wherein the tension applying means are threadably linked to the supporting means to apply rotation to said supporting means.

* * * * *